United States Patent
Talapureddi et al.

(10) Patent No.: US 12,424,113 B2
(45) Date of Patent: Sep. 23, 2025

(54) ASSET POSITION TRACKING WITH EXTERNAL OBJECT

(71) Applicant: Honeywell International Inc., Charlotte, NC (US)

(72) Inventors: Murali Mohan Talapureddi, Hyderabad (IN); Madhava Gadicherla, Bangalore (IN); Saravanakumar Gurusamy, Bangalore (IN)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 217 days.

(21) Appl. No.: 18/062,497

(22) Filed: Dec. 6, 2022

(65) Prior Publication Data

US 2024/0127703 A1    Apr. 18, 2024

(30) Foreign Application Priority Data

Oct. 14, 2022  (IN) .............................. 202211058805

(51) Int. Cl.
| | |
|---|---|
| G08G 5/06 | (2006.01) |
| B60T 3/00 | (2006.01) |
| B64C 25/26 | (2006.01) |
| G01C 21/20 | (2006.01) |
| G08G 5/00 | (2025.01) |
| G08G 5/21 | (2025.01) |
| G08G 5/51 | (2025.01) |

(52) U.S. Cl.
CPC .................. *G08G 5/51* (2025.01); *B60T 3/00* (2013.01); *G01C 21/20* (2013.01); *G08G 5/21* (2025.01); *B64C 25/26* (2013.01)

(58) Field of Classification Search
CPC ... B60T 3/00; B64C 25/26; B64F 1/16; G01C 21/20; G08G 5/0013; G08G 5/0026; G08G 5/0082; G08G 5/065; G08G 5/21; G08G 5/51
See application file for complete search history.

(56) References Cited

U.S. PATENT DOCUMENTS

| | | | |
|---|---|---|---|
| 11,046,298 B1* | 6/2021 | Desmarais | G01G 19/021 |
| 2020/0039556 A1* | 2/2020 | Burch, V | B62B 5/048 |
| 2020/0290587 A1* | 9/2020 | Duffy | B60T 17/22 |
| 2023/0312268 A1* | 10/2023 | Teichrob | B65G 47/18 |
| | | | 198/560 |

FOREIGN PATENT DOCUMENTS

JP          2021163031 A    * 10/2021

* cited by examiner

*Primary Examiner* — Peter D Nolan
*Assistant Examiner* — Ce Li Li
(74) *Attorney, Agent, or Firm* — ALSTON & BIRD LLP

(57) ABSTRACT

A method including: receiving data associated with a unique identity of a vehicle asset to identify the vehicle asset; receiving data associated with a unique identity of a smart wheel chock to identify the smart wheel chock; associating the identified vehicle asset with the identified smart wheel chock, such that a location of the smart wheel chock can represent a location of the vehicle asset; receiving location data associated with the location of the smart wheel chock, wherein the received location data is based, at least in part, on location data generated by one or more systems on the smart wheel chock; and identifying the vehicle asset location based on the received smart wheel chock location data such that the vehicle asset can be determined and relayed to a user device to locate the vehicle asset.

17 Claims, 9 Drawing Sheets

ASSET POSITION TRACKING WITH EXTERNAL OBJECT

CROSS-REFERENCE TO RELATED APPLICATION(S)

This application claims the benefit of priority to Indian Patent Application No. 202211058805, filed Oct. 14, 2022, the entirety of which is incorporated by reference herein.

TECHNICAL FIELD

Various embodiments of the present disclosure relate generally to the field of identifying and maintaining vehicles and, more particularly, to smart wheel chocks and related systems for identifying and maintaining vehicles.

BACKGROUND

Certain high value assets (HVA) (e.g., aircraft, aerospace asset, etc.) may require capabilities for constant location tracking. Constant tracking may facilitate operational readiness, meet insurance requirements, as well as provide owner/operator peace of mind. However, in certain environments, tracking devices installed on or otherwise powered by the HVA may not be independently powered. Moreover, certification requirements associated with aircraft and other HVAs can be carried over to individual systems and devices aboard such aircraft and HVAs, which certification requirements would not be in place for a standalone system or device (i.e., a system or device separate from the aircraft or HVA). This may unnecessarily complicate implementation of the system or device.

One system that is common to many, if not all, aircraft is the aircraft wheel chock. Wheel chocks may be used to physically prohibit movement of the aircraft by friction with the wheel. Aircraft chocks are generally interchangeable between aircraft and relatively simple to operate: personnel may place them in front of, behind, or around a wheel such that the aircraft remains in place when grounded. However, their interchangeability and lack of any electronics or power supply mean they can serve merely a simple mechanical function—that is, prohibiting movement—and thus provide no other benefit to the owner/operator of the HVA. Hence, a ubiquitous, relatively large aircraft operations support part is serving only a limited purpose, when it could solve one or more complex problems associated with storage and maintenance of HVAs. The present disclosure is directed to overcoming one or more of these above-referenced challenges or shortfalls.

SUMMARY OF THE DISCLOSURE

According to certain aspects of the disclosure, methods and systems are disclosed for smart wheel chocks and related systems.

For instance, in one embodiment a method includes: receiving data associated with a unique identity of a vehicle asset to identify the vehicle asset; receiving data associated with a unique identity of a smart wheel chock to identify the smart wheel chock; associating the identified vehicle asset with the identified smart wheel chock, such that a location of the smart wheel chock can represent a location of the vehicle asset; receiving location data associated with the location of the smart wheel chock, wherein the received location data is based, at least in part, on location data generated by one or more systems on the smart wheel chock; and identifying the vehicle asset location based on the received smart wheel chock location data such that the vehicle asset can be determined and relayed to a user device to locate the vehicle asset.

In another embodiment, a method includes: querying a plurality of smart wheel chocks to determine whether one or more of the plurality of smart wheel chocks is associated with any vehicle asset; receiving data from one or more of the queried smart wheel chocks indicating that the one or more smart wheel chocks is not associated with any vehicle asset; selecting one of the one or more smart wheel chocks that is not associated with a vehicle asset for association with the unassigned vehicle asset; associating the selected smart wheel chock with the unassigned vehicle asset such that the unassigned vehicle asset is a newly assigned vehicle asset; receiving location data generated by one or more locating systems on the selected smart wheel chock, the location data being received from the selected smart wheel chock and identifying a location of the selected smart chock; and assigning the newly assigned asset a location based on the received location data from the selected smart wheel chock.

In yet another embodiment, a system includes a vehicle asset; a smart wheel chock comprising at least one vehicle asset identification system; a processor and a memory storing one or more processor-readable instructions that, when executed, cause the processor to: receive data associated with a unique identity of a vehicle asset to identify the vehicle asset; receive data associated with a unique identity of a smart wheel chock to identify the smart wheel chock; associate the identified vehicle asset with the identified smart wheel chock, such that a location of the smart wheel chock can represent a location of the vehicle asset; receive location data associated with the location of the smart wheel chock, wherein the received location data is based, at least in part, on location data generated by one or more systems on the smart wheel chock; and identify the vehicle asset location based on the received smart wheel chock location data such that the vehicle asset can be determined and relayed to a user device to locate the vehicle asset.

Additional objects and advantages of the disclosed embodiments will be set forth in part in the description that follows, and in part will be apparent from the description, or may be learned by practice of the disclosed embodiments.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

DETAILED DESCRIPTION OF EMBODIMENTS

Various embodiments of the present disclosure relate generally to the field of identifying and maintaining vehicles and, more particularly, to smart wheel chocks and related systems for identifying and maintaining vehicles. While this disclosure describes the methods and systems with reference to aircraft, it should be appreciated that the present methods and systems may be applicable to various other vehicles that are parked or stored on the ground.

Figure 1:
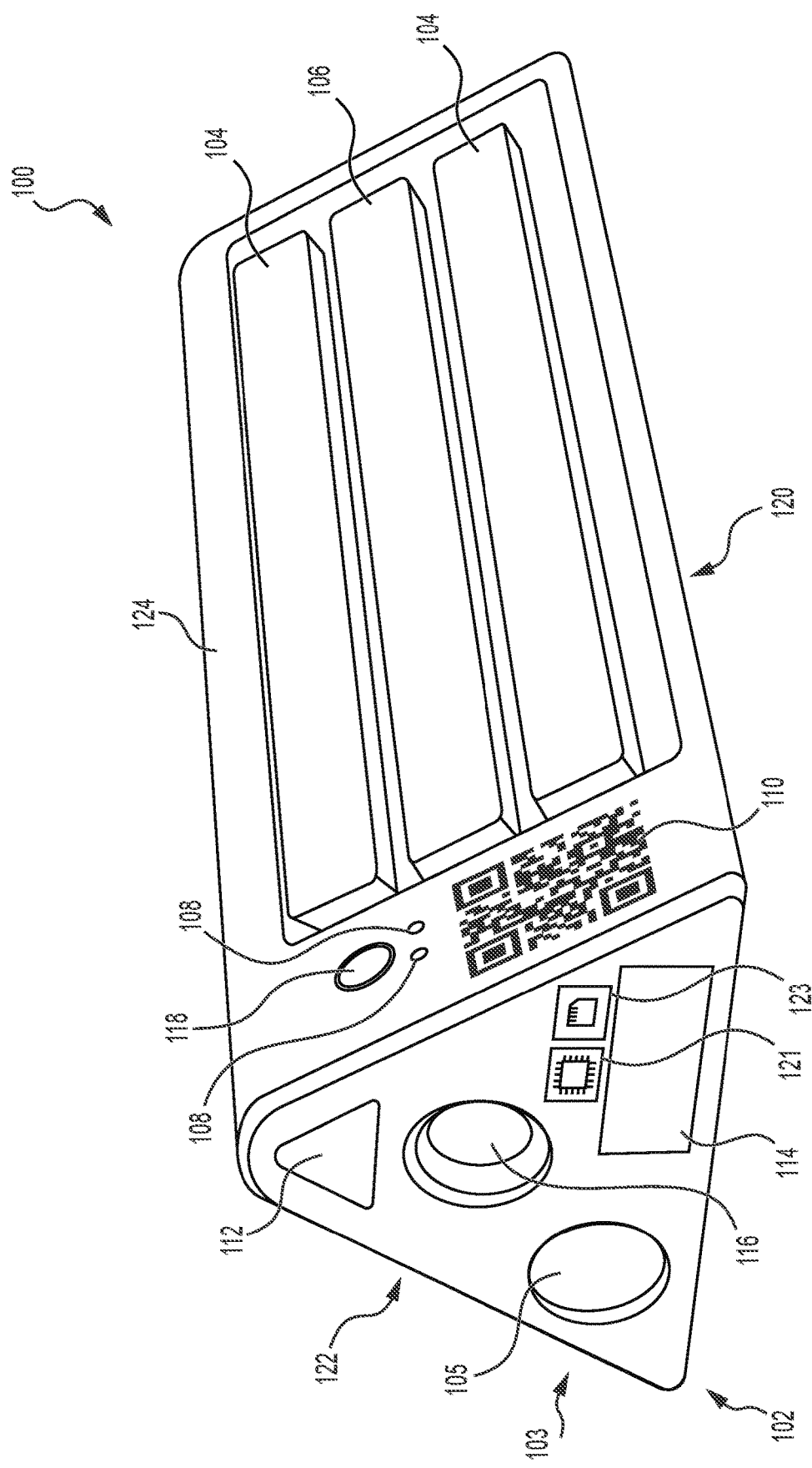
FIG. 1 depicts a perspective view of a smart wheel chock, according to one or more embodiments.
Figure 2:
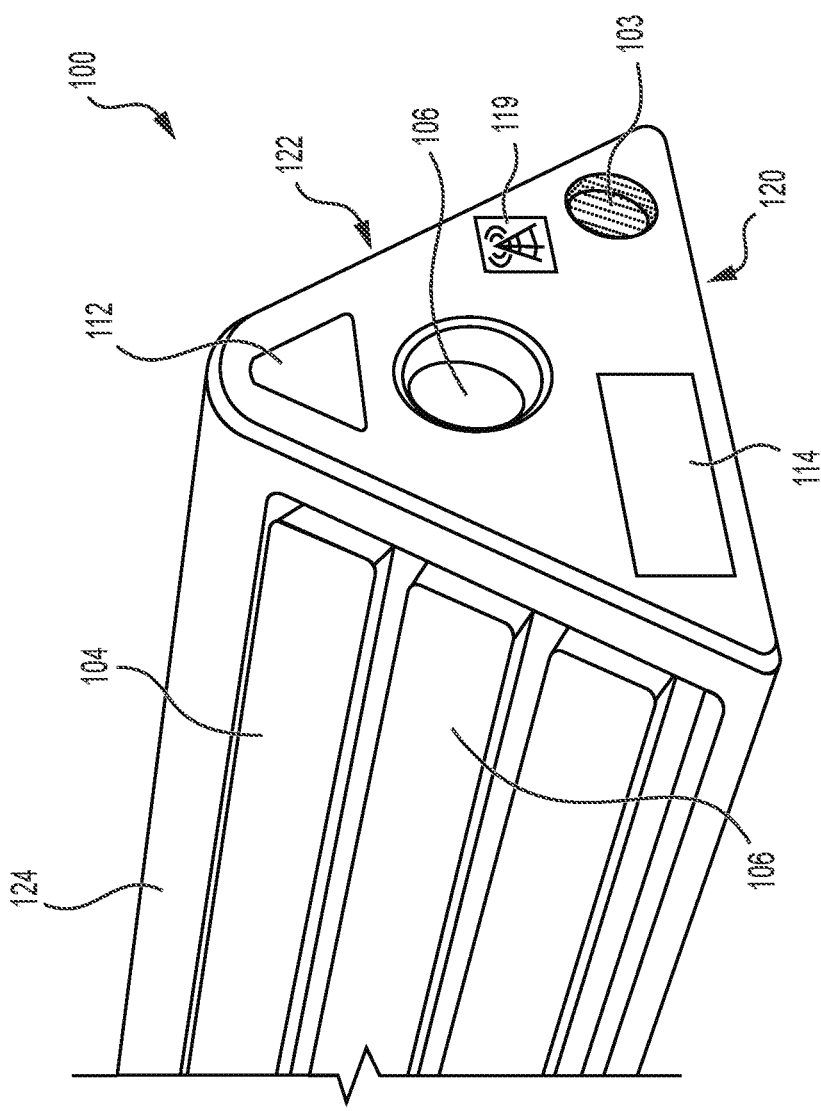
FIG. 2 depicts a second view of the smart wheel chock of FIG. 1.

FIGS. 1 and 2 depict a smart wheel chock 100 for engaging a wheel of a vehicle to inhibit or prohibit movement of the vehicle. The smart wheel chock 100 (or simply "chock") includes a power supply 102 which may include a power conduit 103 for a removable battery 105, one or more solar panels 104, one or more lights 106, one or more antennae 108, a unique identifier 110, a first writing surface 112, a second writing surface 114, a connector inlet 116, a camera 118, a wireless communication device 119 (schematically depicted), a processor 121 (schematically depicted), and a memory 123 (schematically depicted). The specific features and associated systems of the chock 100 shown in FIG. 1 are exemplary only and not intended to limit the smart wheel chock 100 to any particular embodiment or arrangement of components or features.

The chock 100 generally comprises multiple surfaces, which surfaces may meet at edges. The particular embodiment depicted in FIG. 1 includes a ground engaging surface 120, a wheel engaging surface 122, and a smart surface 124. The ground engaging surface 120 may generally face the ground and may include one or more surface enhancement features for enhancing the level of friction between the chock 100 and ground such that the asset held by the chock 100 is less likely to move when a wheel rests against the wheel engaging surface 122. The wheel engaging surface 122 may be, for example, a matte surface and may include one or more features for increasing friction with the asset wheel to prevent the asset wheel from rotating when engaged with the wheel engaging surface 122.

The smart surface 124 may include one or more features for charging a power supply of the chock 100, one or more features for identifying the chock 100 and/or the asset associated therewith, and one or more other features. For example, the smart surface 124 may include the one or more solar panels 104.

The solar panels 104 may comprise a plurality of solar cells that are capable of converting solar energy into electrical charge to charge the power supply 102 (e.g., the rechargeable battery 105). The solar panels 104 may be mechanically and electrically coupled to the chock 100 and may be engineered such that they can support the weight associated with stopping, arresting, or prohibiting the movement of an asset while the chock 100 is installed beside an asset wheel. The light 106 may be an LED, LED array, UV, or other light which may be used to illuminate a space surrounding the chock 100 such that a user of the chock 100 is assisted in low light conditions. In some embodiments, the light 106 may include multiple LED arrays or panels including multiple LED colors. The LED panel may be used to indicate, for example, a tail number of an aircraft intended to park at the chock 100 (so the pilot piloting an aircraft or other asset assigned to the chock can know exactly to which chock to pull up). The LED panel could also indicate a pairing of an asset with the chock 100 or one or more other features of the chock 100 as will be described in greater detail herein.

The power supply 102 of the chock 100 may include one or more removable and/or rechargeable batteries 105 and may generally supply power to the components of the chock 100 such that the chock 100 is self-powered. In some embodiments, the power supply 102 may store one or more removable batteries to supply power to the systems of the chock 100. In some embodiments, the battery 105 may be removed in order to charge the power supply 102 and in other embodiments the battery 105 may be capable of being charged while the battery 105 is inside the chock 100. For example, the battery 105 may be charged using electricity generated by the solar panels 104 and/or power supplied by an electric grid (not shown) while the battery 105 is installed in the chock 100.

The camera 118 may be powered by the power supply 102 and may be configured with a point of view which may look out from the chock 100 (for example, may face the asset when the chock 100 is in place holding the asset in position on an airfield, in a hangar, or in another storage location). The camera 118 may be a visual, infrared, or other camera configured to capture image data of the surrounding area such that it can capture image data of an asset that is being held in place with the chock 100. In some embodiments, the asset (not shown) may have one or more identifying marks or visible, infrared, or other camera-identifiable images that may be used to determine a specific identity of the asset. For example, an asset may have a QR code beneath its fuselage which QR code may be captured using the camera 118 when the chock 100 is in place and arresting movement of the asset such that the asset can be uniquely identified with the image data captured by the chock 100. In some embodiments, the camera 118 may capture an image of the asset when the asset is within a capture range of the camera such that the camera can capture visual images of the asset. The image data may be sent from the chock 100 using, for example, a wireless communications device 119.

The unique identifier 110 may be, for example, a quick read (QR) code, a bar code, a glyph, an RFID tag, a sticker, etc. and may be associated with the chock 100 in a database external to the chock 100. In some embodiments, the unique identifier 110 may be permanently or temporarily associated with an asset. The unique identifier 110 may be associated with an asset using, for example, a tail number, a vehicle identification number, or other asset identifying feature. The unique identifier 110 may be scanned with a camera or other scanner to capture data associated with the unique identifier which may captured data may be used to identify the chock 100.

The writing surface 112 and the second writing surface 114 may provide a surface for marking the chock 100 with hand-written identifying or other information such that users of the system can make notes and record information associated with use of the chock 100.

The connector inlet 116 may provide a space for connecting a rope, chain, electrical cording or wiring, or other connecting device for coupling one chock 100 with another chock to form a chock system for surrounding a wheel of an asset as will be explained in greater detail herein.

The processor 121 may include a single processor or multiple processors configured to receive inputs, display outputs, and generate commands to control the operation of components of the chock 100. The processor 121 and the memory 123 may be configured as a control module which control module may include a memory, a secondary storage device, processor(s), such as central processing unit(s), networking interfaces, or any other means for accomplishing tasks consistent with the present disclosure. The memory or secondary storage device associated with the control module may store data and software to allow the control module to perform its functions, including the functions described herein. One or more of the devices or systems communicatively coupled to the processor 121 and the memory 123 may be communicatively coupled over a wired or wireless network, such as the Internet, a Local Area Network, WiFi, Bluetooth, or any combination of suitable networking arrangements and protocols. The processor 121 and the memory 123 may be communicatively coupled with other aspects of the chock 100 (e.g., the wireless communications device 119, the camera 118, etc.) to send and receive data from the other aspects.

The wireless communications device 119 may be configured to send and receive wireless signals to and from various external systems. In some embodiments, the wireless communications device 119 may be incorporated into the chock 100. In other embodiments, it may be a separate component. The wireless communications device 119 may aid the chock 100 in device location (e.g., an area of a facility such as a runway, a hangar, a maintenance facility, etc.). The wireless communications device 119 may be communicatively coupled to a wireless communications network as described in greater detail herein. Generally, the wireless communications device 119 may receive wireless signals that may be indicative of a location of the chock 100 within the area and a location of one or more assets. The wireless signals may correspond with, for example, GPS or other signals received by the wireless communications device 119. In some embodiments, the wireless communications device 119 may comprise a GNSS (e.g., GPS, etc.) signal transmitter/receiver and may be capable of receiving and sending a GNSS signal. In some embodiments, the wireless communications device 119 may be communicatively coupled to a wireless communications network to send and receive wireless communications from the network. In some embodiments, the wireless communications device 119 may be configured to generate and/or receive Bluetooth signals (e.g., BLE, etc.) such that the chock 100 can communicate with one or more external systems using a Bluetooth connection. The external devices (not shown) may couple with the chock 100 to send and/or receive data from the chock. Additionally, the wireless communications device 119 may be a wireless router and may be used to configure a local area network (LAN) to which LAN one or more external devices or systems may communicatively couple. For example, an asset and one or more additional smart chocks similar to the chock 100 may communicatively couple to a LAN created by the chock 100. In some embodiments, the wireless communications device 119 may comprise an RFID reader which may read one or more RFID tags on external or internal systems. For example, the wireless communications device 119 may read one or more RFID tags on a wheel of an asset, the body of an asset, one or more other chocks, etc.

Figure 3:
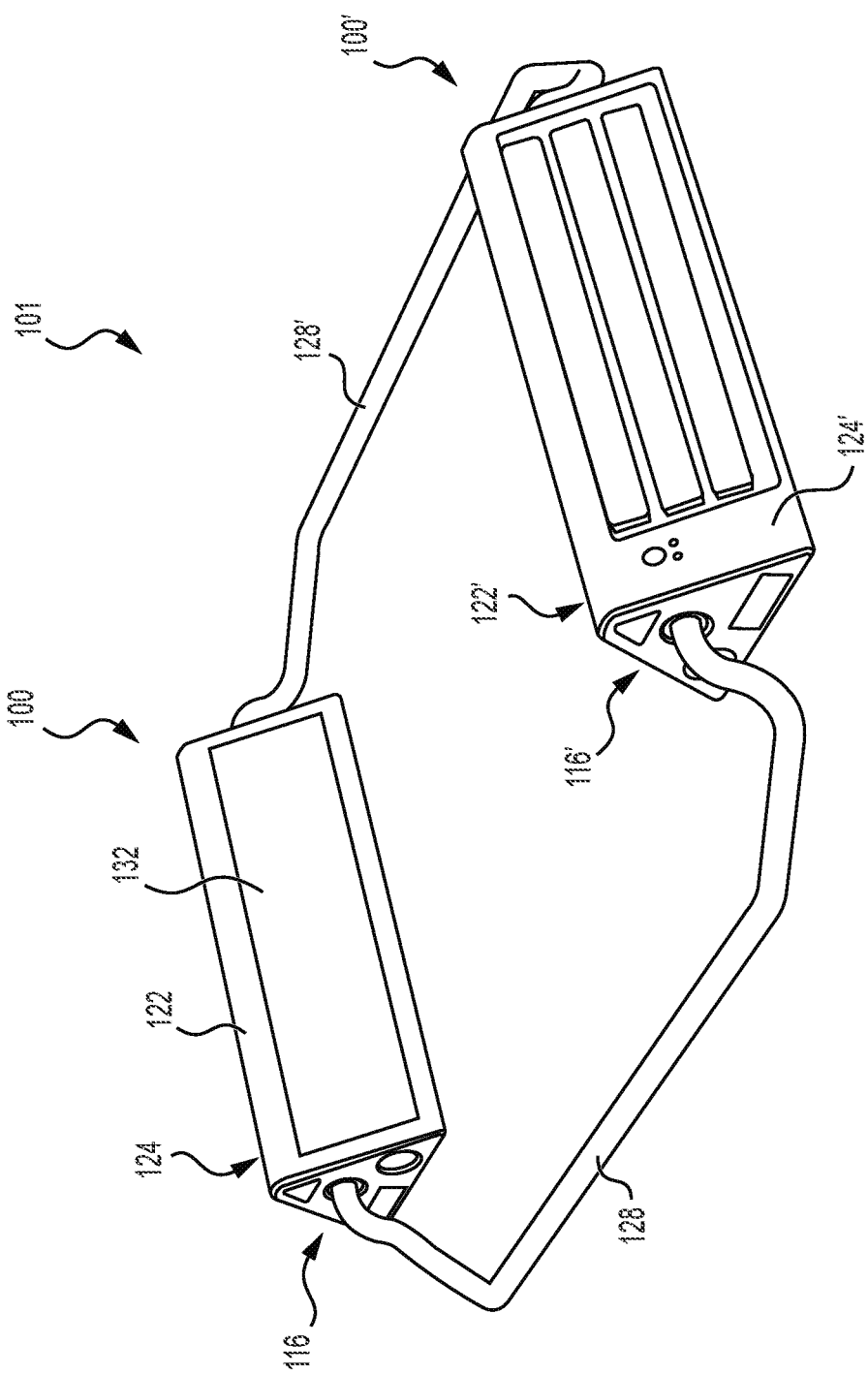
FIG. 3 depicts a dual smart chock system, including at least one smart wheel chock.

FIG. 3 shows a dual chock system 101 including a chock 100 and a second chock 100'. As shown, the chock 100 and the second chock 100' are equivalent, but this is not required. In some embodiments, the first chock 100 and the second chock 100' are not equivalent. For example, the chock 100 may be a smart chock and the second chock 100' may not be a smart chock. A wheel engaging surface 122 and a second wheel engaging surface 122' may face inward and be configured to surround a wheel (not shown) of an asset and the chock 100 and the second chock 100'. In some embodiments, the wheel engaging surface 122 may include a matte surface 132. The second wheel engaging surface 122' may also include a matte surface (not shown). The chock 100 and the second chock 100' are coupled by the connector 128 and the second connecter 128'. The connector 128 may connect to the chock 100 and the second chock 100' at the connector inlet 116 and the second connector inlet 116'. The connector inlet 116 and the second connector inlet 116' may be, for example, a threaded connection, a magnetic coupler, or some other coupling device capable of removably coupling the connector 128 with the chock 100 and the second chock 100'. The connector 128 and the second connector 128' may couple the chock 100 and the second chock 100' when they surround the wheel (not shown) such that the chock 100 and the second chock 100' do not separate when one or both of them is installed to prevent motion of an asset.

Figure 4:
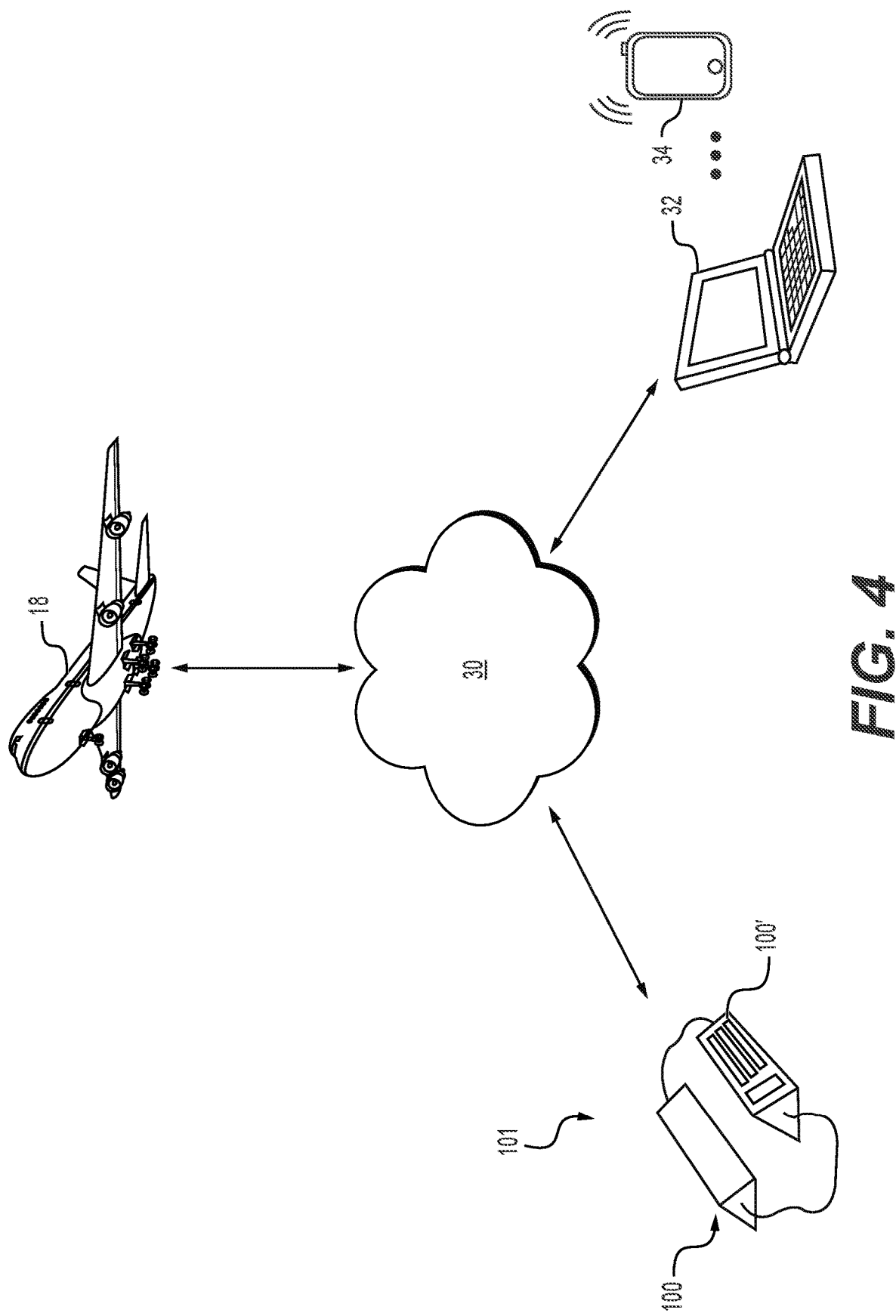
FIG. 4 schematically depicts a network for using the smart wheel chock to locate an asset.

FIG. 4 depicts an exemplary computing environment for enabling communicative interaction of one or more of the systems described herein is shown. FIG. 4 shows network 30 that communicatively couples an exemplary asset 18, a chock 100 and a second chock 100' that may be part of a dual chock system 101, a digital device 32, and one or more handheld digital devices 34 (collectively referred to as "digital device"). The network 30 may be an example of an environment for implementing various methods and systems according to the present disclosure. The network 30 may include a plurality of nodes that may be connected to each other through the network 30 (e.g., the chock 100, the second chock 100', the asset 18, and the devices). Network 30 may include a computer system on board an asset such as the asset 18. The asset may be one or more of an airplane, a helicopter, an unmanned aerial vehicle (UAV), an aerospace asset, or other type of aircraft or other vehicle (e.g., a luggage cart, a truck, etc.) A computer system of an aircraft may, for example, include a flight management system (FMS) or other system used in the control or operation of the aircraft. Such computer systems may be part of the avionics onboard the aircraft, and may be coupled to a display inside the aircraft, such as a cockpit display, which may send and receive data from the chock 100 and/or the dual chock system 101 which may be displayed within the asset 18. The network 30 may also include off-board computer systems that are off-board any aircraft, and/or computer systems comprising a combination of on-board and off-board components (e.g., the digital device 32 and the handheld digital device 34). Additionally, the network 30 may include elements permitting communication between computer systems on-board aircraft and computer systems on the ground. The network 30 may be a peer-to-peer network of nodes that collectively adheres to one or more protocols for various operations involving inter-node communication and management of the network 30. In such embodiments, membership in the network 30 may be restricted to pre-approved computer systems and/or computer systems belonging to pre-approved parties. In some embodiments, it is also possible for the network 30 to be a public network, such as the Internet. In some embodiments, the network 30 may be a private network within a public network (e.g., the Internet). Each of the nodes connected to the network 30 may have different functions, permissions, or privileges in performing operations pertaining to usage of the network 30. The asset 18 and other assets may communicatively couple to the network 30 when it is in the air or on the ground.

The asset 18 is shown both flying and having landed and moving forward toward a dual chock system 101. Second asset 20 and third asset 22 are already engaged with a second dual chock system 101' and a third dual chock system 101", respectively. The aft chock 100' of the dual chock system 101 may indicate to the asset 18 that it is the intended dual chock system 101 for the asset 18 by generating a signal which may be visible to a pilot of the asset 18 as the asset 18 approaches the dual chock system 101. For example, the aft chock 100' may light up a green LED panel of the light 106 (FIG. 1) and/or display an aircraft tail number associated with the asset 18 (e.g., as shown in the figure: "18"). As the asset 18 pulls forward to engage the dual chock system 101, one or more of the forward chock 100 and the aft chock 100' may receive data from the asset 18 indicating that it is the correct or incorrect asset for coupling with the dual chock system 101. For example, a camera on the aft chock 100' (e.g., the exemplary camera 118 of FIG. 1) may capture visual data of the asset 18 which may be compared to visual data in a database of assets, may be verified by an external user, etc. In some embodiments, the asset 18 may broadcast an RFID signal which may be read by an RFID reader of the dual chock system 101. Other methods of identifying the asset 18 are contemplated.

The asset 18 may be identified by the dual chock system 101 and a user may place the dual chock system 101 in place surrounding a wheel of the asset 18 (e.g., the forward wheel(s)) once the asset 18 is in a suitable position for parking. The dual chock system 101 may then be associated with the asset 18 such that the location of the asset can be determined based on the location of one or more of the chocks of the dual chock system 101. For example, a user may scan a unique identifier 110 of the forward chock 100 and associate the unique identifier 110 with a tail number of the asset 18. Because the location of the chock 100 is known (e.g., based on a location identified with the wireless communications device 119) the location of the asset 18 can be deduced. The dual chock system 101 may thus provide a redundant source of asset location or singular source of asset location in the instance of shutdown of one or more location tracking devices of the asset (e.g., in the case of a complete power down of the asset, during maintenance of on-board tracking systems, for security purposes, etc.)

Figure 5:
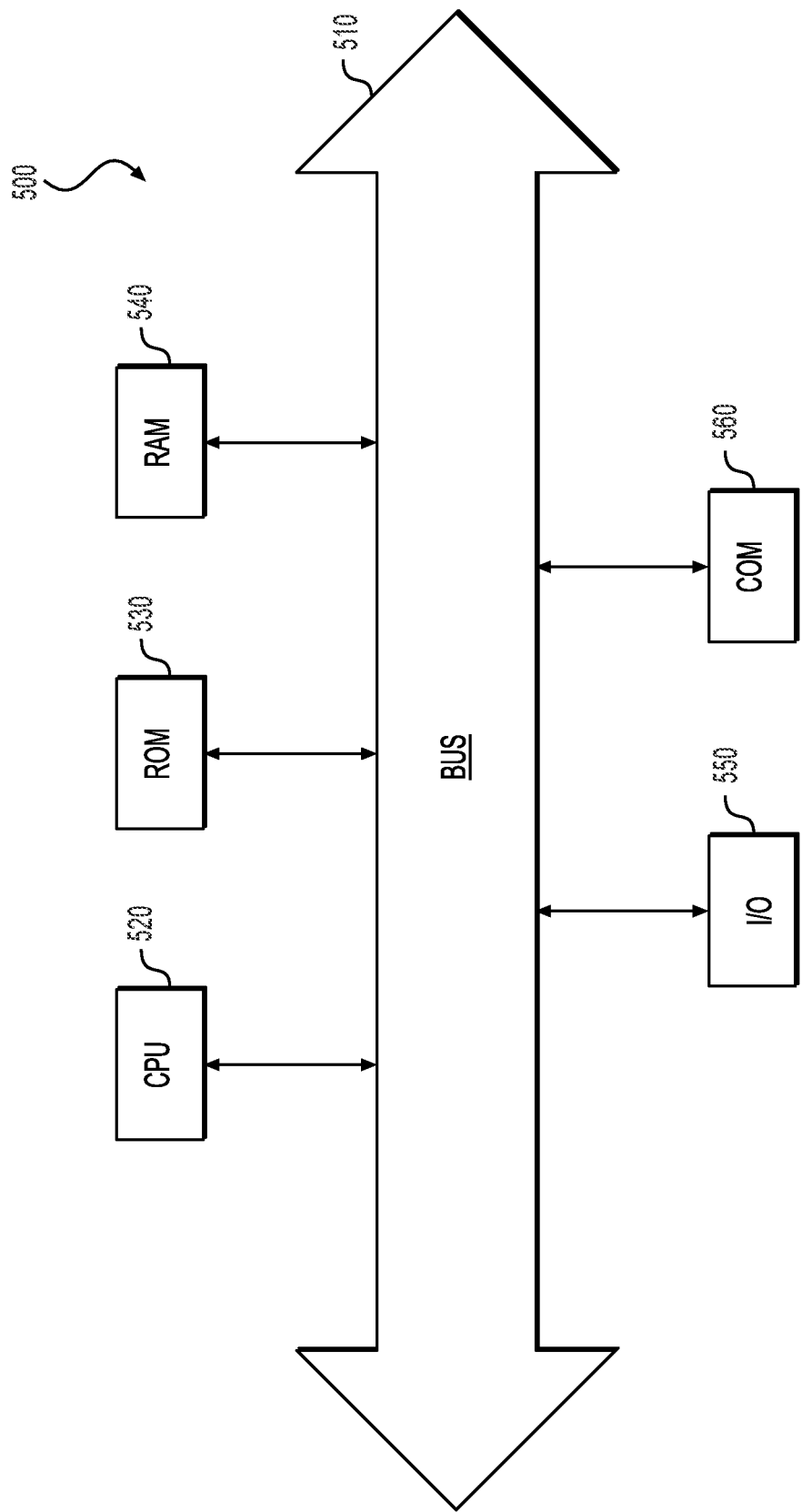
FIG. 5 is a simplified functional block diagram of a computing system for carrying out one or more of the functions of the embodiments described herein.

FIG. 5 is a simplified functional block diagram of a computing system 500 that may be configured for carrying out one or more of the steps, programs, and/or executing techniques described herein, according to exemplary embodiments of the present disclosure. Specifically, in one embodiment, any modules or computing resources of the chock 100 (e.g., the processor 121, memory 123) or other systems or features including computing resources may be an assembly of software and/or hardware including, for example, a data communication interface 560 for packet data communication. The platform may also include a central processing unit ("CPU") 520, in the form of one or more processors, for executing program instructions. The platform may include an internal communication bus 510, program storage, and data storage for various data files to be processed and/or communicated by the platform such as ROM 530 and RAM 540, although the system 500 may receive programming and data via network communications. The system 500 also may include input and output ports 550 to connect with input and output devices such as keyboards, mice, touchscreens, monitors, displays, etc. Of course, the various system functions may be implemented in a distributed fashion on a number of similar platforms, to distribute the processing load. Alternatively, the systems may be implemented by appropriate programming of one computer hardware platform.

Any suitable system infrastructure may be put into place to allow for the assessment of models monitoring devices. FIG. 5 and the following discussion provide a brief, general description of a suitable computing environment in which certain embodiments and aspects thereof the present disclosure may be implemented. In one embodiment, any of the disclosed systems, methods, and/or graphical user interfaces may be executed by or implemented by a computing system consistent with or similar to that depicted in FIG. 5. Although not required, aspects of the present disclosure are described in the context of computer-executable instructions, such as routines executed by a data processing device, e.g., a server computer, wireless device, and/or personal computer. Those skilled in the relevant art will appreciate that aspects of the present disclosure can be practiced with other communications, data processing, or computer system configurations, including: Internet appliances, hand-held devices (including personal digital assistants ("PDAs")), wearable computers, all manner of cellular or mobile phones (including Voice over IP ("VoIP") phones), dumb terminals, media players, gaming devices, virtual reality devices, multi-processor systems, microprocessor-based or programmable consumer electronics, set-top boxes, network PCs, mini-computers, mainframe computers, and the like. Indeed, the terms "computer," "server," and the like, are generally used interchangeably herein, and refer to any of the above devices and systems, as well as any data processor.

Figure 6:
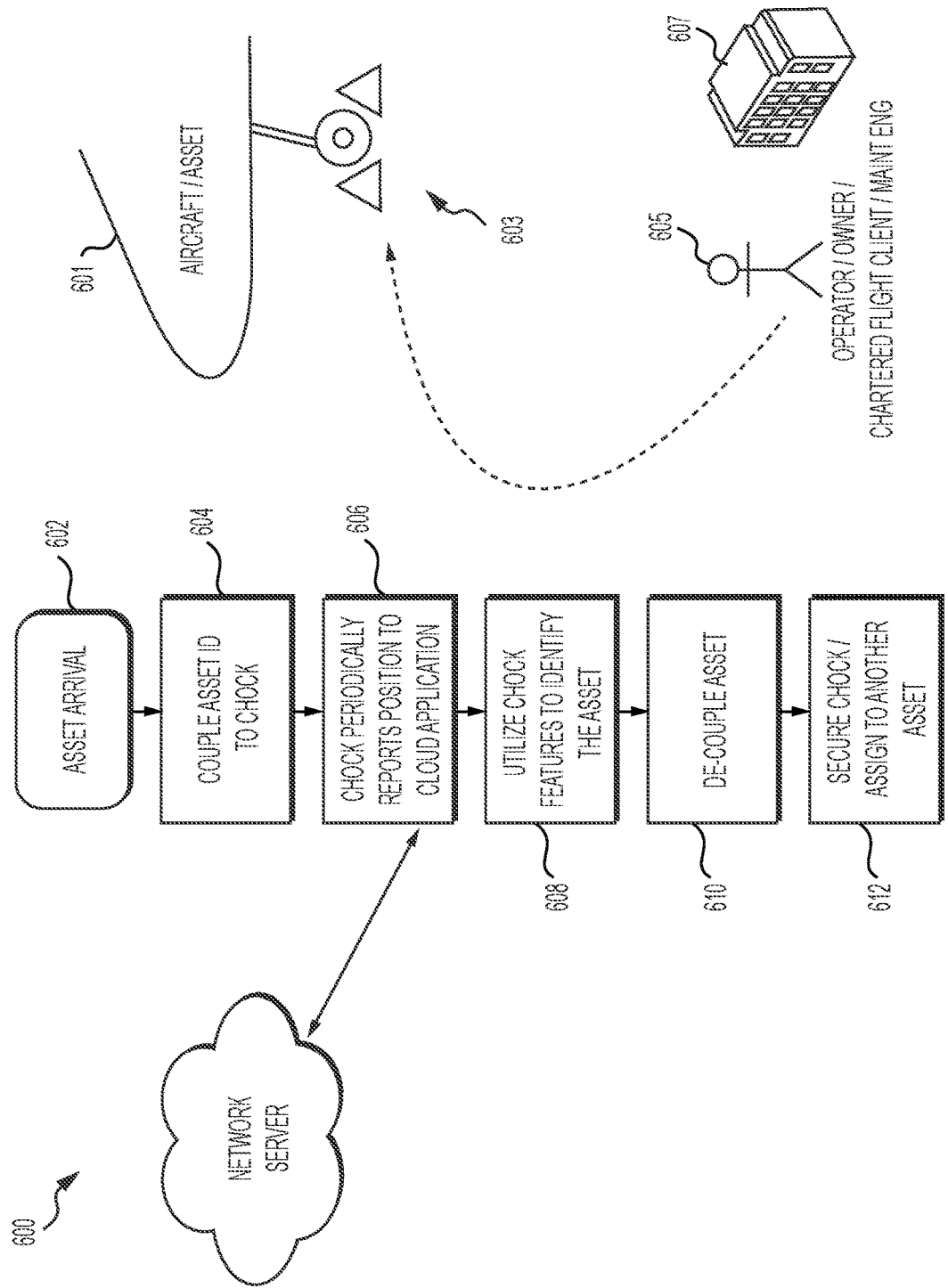
FIG. 6 is a method of recording an asset storage location based on identification using a smart wheel chock.

FIG. 6 depicts a method 600 of identifying an asset (e.g., aircraft (rotary, fixed wing, hybrid, etc.), UAV, aerospace, other vehicle, etc.) using a smart wheel chock which has been paired with the asset. The method 600 and equipment used to implement the method 600 are merely exemplary and not limited to the particular steps listed or equipment described herein or shown in FIG. 6. At step 602, an asset may arrive at or within a connection radius of a facility using smart wheel chocks. For example, an asset may add a facility using smart wheel chocks to its flight plan as an anticipated landing location and may connect to the network 30 in order to connect with one or more smart wheel chocks. Connection to the network 30 may suffice for arrival in this instance because the asset may be able to communicate with one or more smart wheel chocks and the network with which they communicate.

Once the asset has arrived, it may be assigned a smart wheel chock with which to couple to serve as the proxy location of the asset and at step 604 the asset ID may be coupled to the smart wheel chock. In order to couple the asset to the chock, the network 30 may receive data associated with a unique identity of the asset. For example, the network 30 may receive a tail number or other unique identifier of the asset. Based on this unique identity, the network 30 may identify the asset and may store the identity of the asset. Additionally, the network 30 may receive data associated with a unique identity of a smart wheel chock to identify an available smart wheel chock for coupling with the asset. The available smart wheel chock can be identified, for example, by personnel at a facility scanning a unique identifier of an available asset and uploading information related to the availability to the network 30.

Once the asset and the smart wheel chock are both identified, the asset may be associated with the smart wheel chock and the smart wheel chock may be removed from a list of available smart wheel chocks such that it is not assigned to any other asset(s) (e.g., arriving aircraft, etc.) The personnel can use the smart wheel chock to inhibit movement of the asset by placing the smart wheel chock around a wheel of the asset and the smart wheel chock can serve as a proxy for the location of the asset.

At step 606, the network 30 may receive location data associated with the location of the smart wheel chock, which location data may approximate the location of the asset such that a user can know the location of the asset. In some embodiments, the chock may periodically report the location data. For example, the network 30 and/or the chock can be programmed such that a location of the chock is reported every hour, every day, etc. Accordingly, the network 30 and connected nodes (e.g., user devices) can receive routine or on-demand updates of the location of the asset.

In some embodiments, at least a portion of the data associated with the unique identity of the asset is captured by the smart wheel chock. That is, one or more of the features of the smart wheel chock 100 may be used to identify the asset. For example, the chock 100 may capture image data of the asset and upload the image data to the network 30. Accordingly, at step 608 the chock features may be used to identify the asset.

At departure or as otherwise necessary (e.g., moving an asset to a different location for maintenance, etc.) the asset may be decoupled from the associated smart wheel chock at step 610. Once the smart wheel chock is decoupled from the asset, the system may no longer recognize the smart wheel chock's location as the asset or vice versa. Accordingly, users of the system (e.g., a user 601 who may be, for example, an operator, owner, chartered flight client or other passenger, maintenance personnel, etc.) would no longer expect to find the asset at the location of the smart wheel chock when arriving or otherwise being present at the airfield 603 and the asset may, for example, leave the storage location.

At step 612, the network 30 may receive a request for a second asset to associate with the smart wheel chock. For example, the network 30 may receive data associated with a unique identity of the second asset and may identify the second asset based on the received data. The network 30 may then associate the identified second asset with the identified smart wheel chock, such that a location of the smart wheel chock can represent a location of the second asset. Received location data associated with the location of the smart wheel chock may then identify the second asset location.

Figure 7:
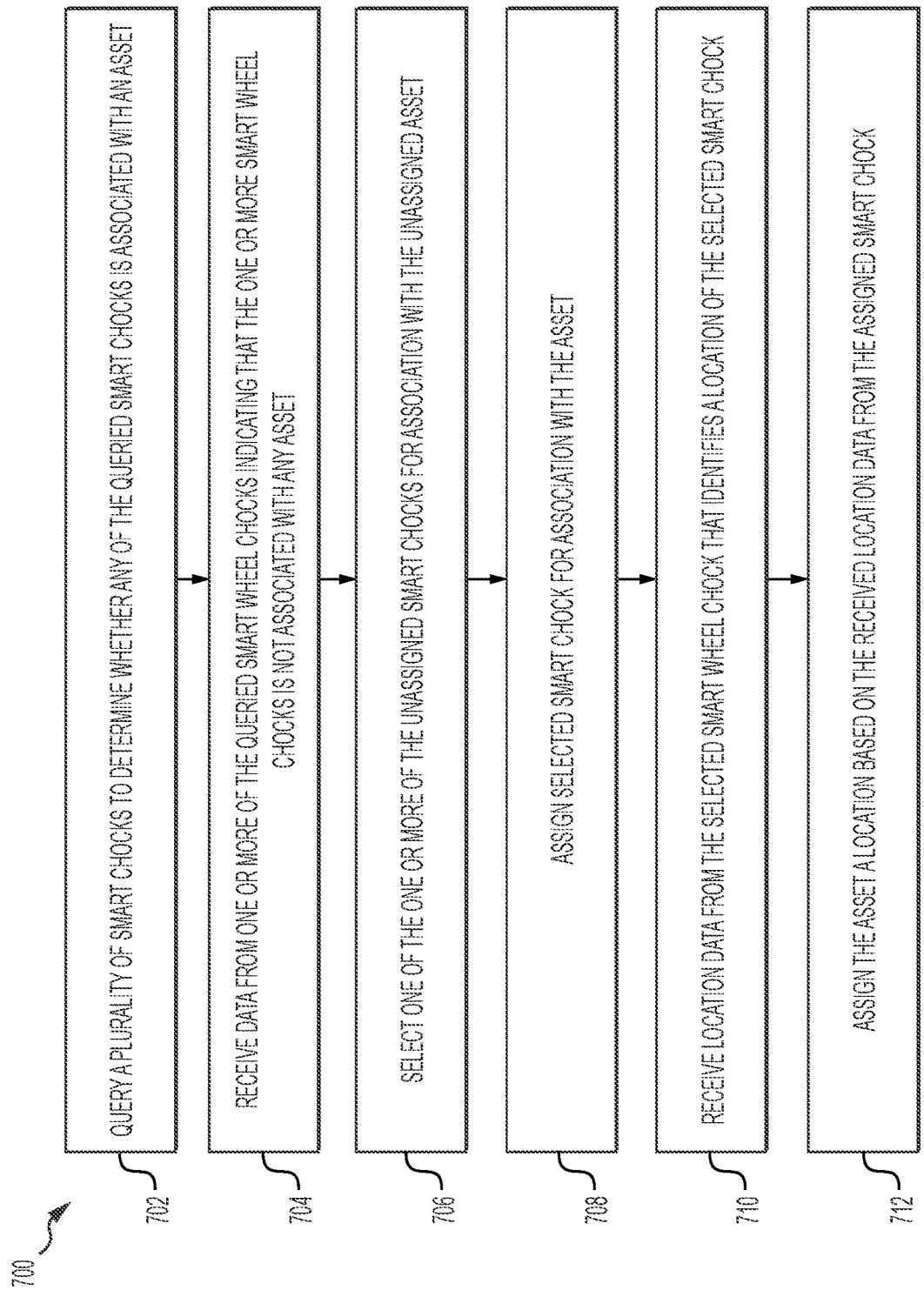
FIG. 7 is a method of assigning a storage location to an asset based on a location of a smart wheel chock.

Referring now to FIG. 7, a method 700 of assigning an asset a location based on received location data from a smart wheel chock is shown. The method 700 and equipment used to implement the method 700 are merely exemplary and not limited to the particular steps listed or equipment described herein or shown in FIG. 7.

At step 702, a plurality of smart wheel chocks may be queried to determine whether one or more of the plurality of smart wheel chocks is associated with any asset. This may prevent smart wheel chocks which may be assigned to an asset from being assigned to a second asset, such that a location of either or both assigned assets would be incurred.

At step 704, the network may receive data from one or more of the queried smart wheel chocks indicating that the one or more smart wheel chocks is not associated with any asset. For example, there may be multiple unassigned chocks, each capable of approximating the location of an asset. Having multiple chocks enables the storage of a larger number of assets.

At step 706, one of the one or more smart wheel chocks that is not associated with an asset may be selected for association with the unassigned asset. For example, a smart wheel chock that is not assigned to any asset currently at a storage facility may be assigned to a newly-arriving asset. Hence, when planes fly in and out of an airfield, for example, the available chocks at the airfield may be determined and then one or more of the available chocks may be assigned to the incoming asset. In some embodiments, the selection may be random. In other embodiments, the selection could be based on, for example, one or more features of an available chock. For example, the selection may be based on a battery level of all available assets such that a chock with a low battery is not selected. In other embodiments, the selection of a chock could be based on a size of the chock. For example, a relatively small chock may not be suitable for an asset with a relatively large wheel. Other selection criteria are possible. For example, a particularly high value asset may be assigned a smart chock with a camera such that visual checks of the asset could be continuously available.

Once a smart chock is selected for assignment to the asset, the smart chock may be associated with the asset such that the unassigned asset is a newly assigned asset at step 708. The assignment may update a database on the network 30, for example, associating the assigned smart chock with the assigned asset. This database may be accessible to users and systems connected to the network such that users and systems are aware of the association and that the selected smart chock is not available for use with another asset.

At step 710, the network 30 may receive location data from the selected smart wheel chock that identifies a location of the selected smart chock and the system may assign the asset a location based on the received location data from the assigned smart chock. This may enable informing users and other aspects of the system of the location of the asset. and at step 712, a location may be assigned to the vehicle asset based on the received location data from the assigned smart chock.

Figure 8:
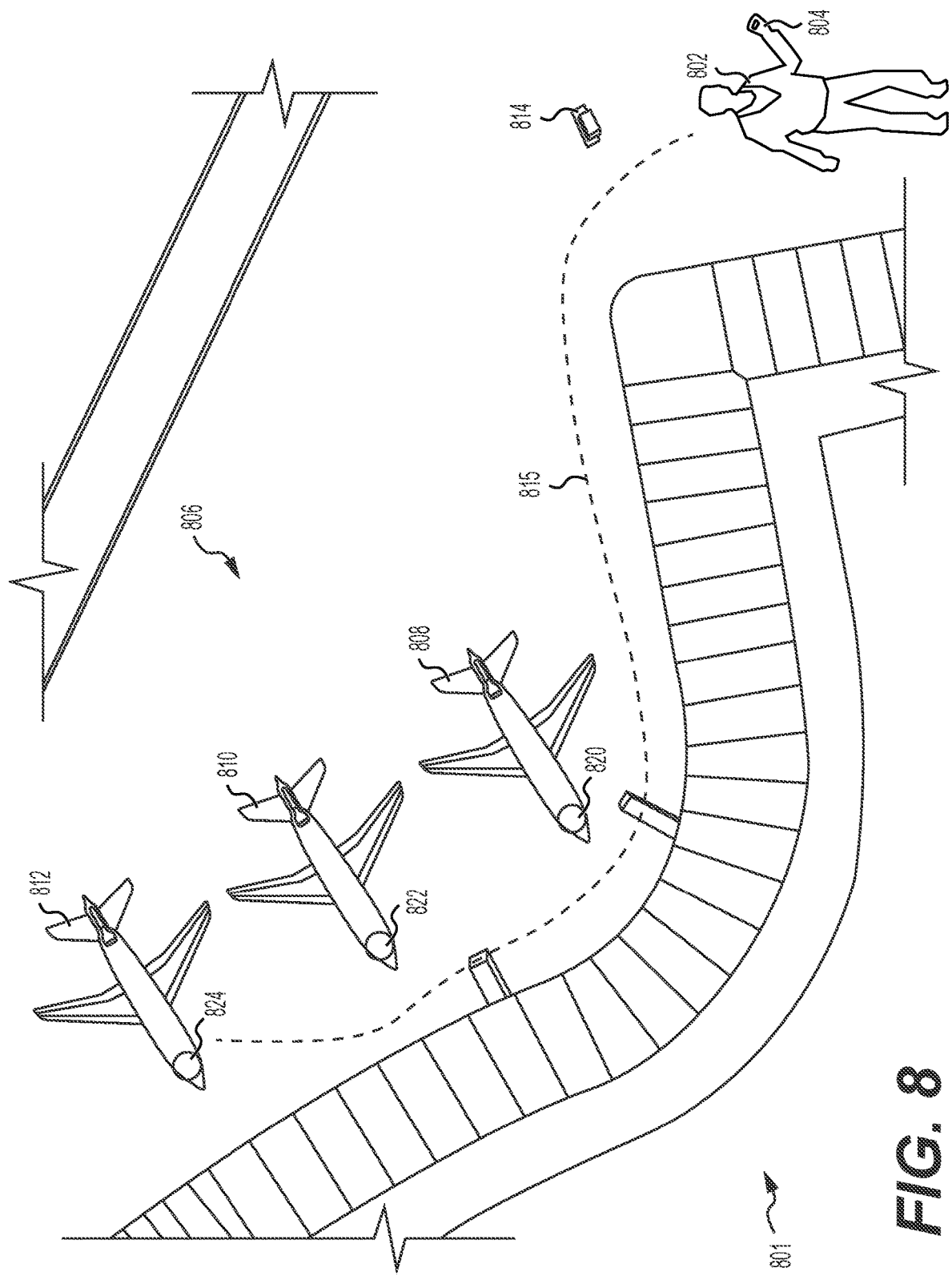
FIG. 8 is an overhead view of an exemplary airfield using a smart wheel chock system to identify assets.

FIG. 8 shows a user 802 with a device 804 that is communicatively coupled to the network 30. The user may be, for example, a passenger scheduled to fly on an asset at the airfield 806. The airfield 806 has three assets parked outside a terminal 801. A first asset 808, a second asset 810, and a third asset 812. A luggage cart 814 is carrying luggage that is intended for the third asset 812. The user 802 intends to board the third asset 812. Each of the assets is parked at a smart wheel chock (each depicted schematically): a first wheel chock 820, a second wheel chock 822, and a third wheel chock 824, respectively. The user 802 may approach the third asset 812 along a route 815.

Figure 9:
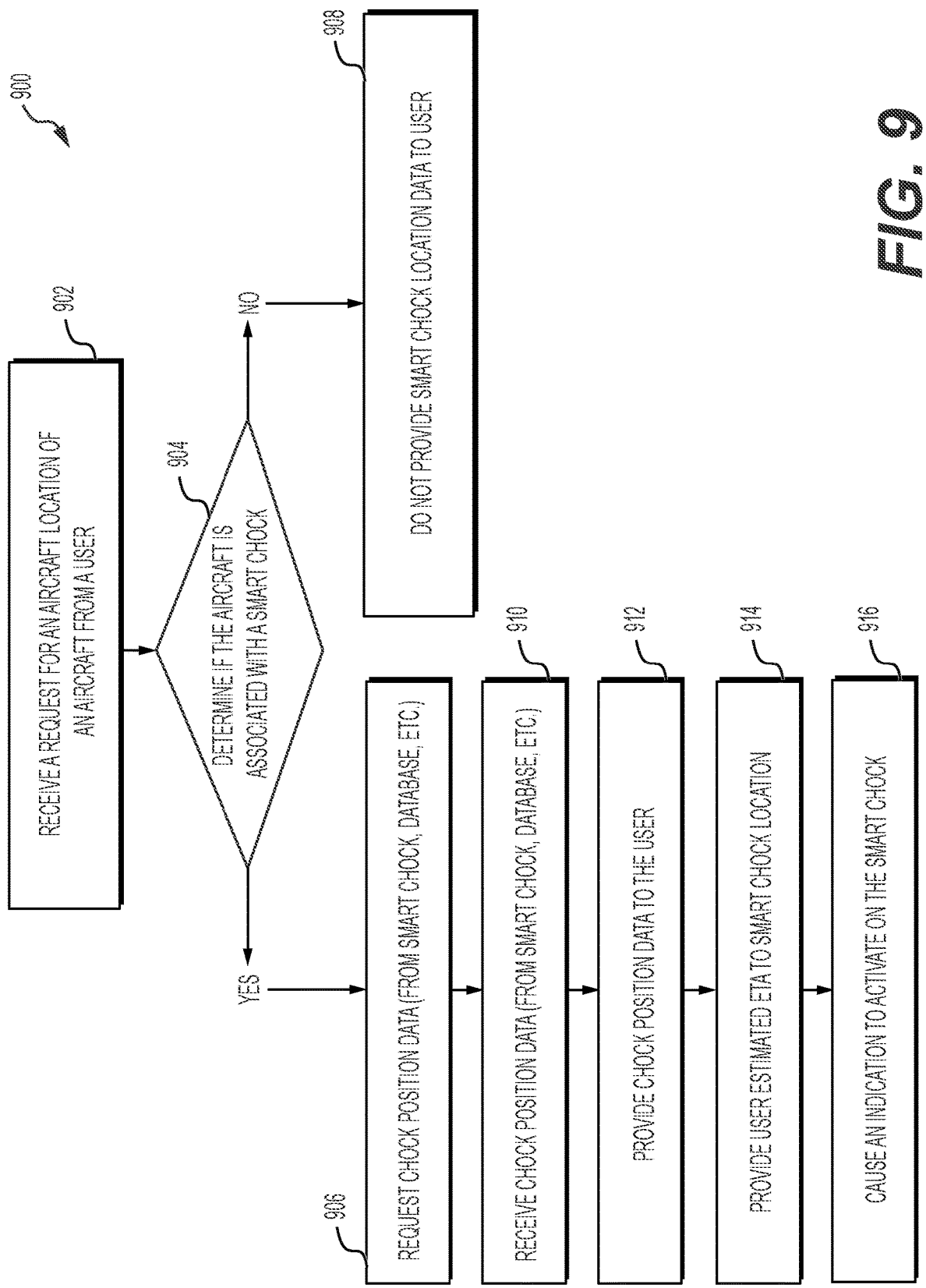
FIG. 9 is a method of locating an asset for a passenger using a smart chock system.

FIG. 9 describes a method 900 for locating and providing a map to an asset. The method could be used by, for example, passengers, maintenance staff, luggage carts, or other users attempting to locate an asset. The method 900 and equipment used to implement the method 900 are merely exemplary and not limited to the particular steps listed or equipment described herein or shown in FIG. 9.

At step 902, the network 30 may receive a request for a location of an asset from a user. For example, the user 802 may request a location of the third asset 812. The user could be, for example, a passenger of the asset, a maintenance worker intending to perform maintenance on the asset, a luggage cart driver, etc. The user's device, for example, be connected to an external database and may associate a ticket number stored in the user's device with a unique identifier (e.g., a tail number) of an aircraft.

At step 904, the system may determine whether the requested asset (e.g., based on the tail number) is associated with a smart wheel chock. The system may, for example, query a database for the asset unique identifier and determine whether the unique identifier has been associated with an asset using, for example, the systems and processes described herein.

At step 908, the system may not provide a smart chock location to the user 802 based on a determination that the smart chock is not associated with an asset. For example, if the asset that the user 802 is trying to find and generates a request to find is not associated with a smart chock, the location of no smart chock may be provided to the user 802 and the user may location the asset in a different manner.

However, at step 906, the system may request a location of the smart wheel chock based on a determination that the smart wheel chock is associated with the requested asset. The system may request the location of the smart wheel chock via the network 30. Because the smart wheel chock is connected with the network 30, the smart wheel chock can provide its real time location. In some embodiments, the smart wheel chock's last reported location could be used in lieu of a real-time location. For example, in the case that a battery or power supply on the smart wheel chock has died, the system could provide the last known location of the smart wheel chock.

At step 910, the system may receive a location of the smart wheel chock. For example, the system may receive a real time location of the smart wheel chock based on a GNSS signal received from a GNSS system on the smart wheel chock. In other embodiments, the system may triangulate the smart wheel chock, for example, using an RF signal (e.g., from a WiFi router) and beacon aboard the smart wheel chock.

At step 912, the system may provide the location of the smart wheel chock to the user such that the user can identify a position of the asset associated with the smart wheel chock based on the position of the smart wheel chock. In some embodiments, the user may not be aware that the smart wheel chock's location is a proxy for the asset such that the user is only aware of a location of the asset. For example, the user may assume that he or she will only approach an asset based on the information provided. The location of the smart wheel chock could be provided along with, for example, a route to approach the location. In some embodiments, the route could be based on a location of other smart wheel chocks, such that a user does not approach assets stored at the other smart wheel chocks too closely and possibly violate airfield regulations. For example, it may be required that passengers maintain a distance of at least 10 meters from any asset except their own. Based on a location of other smart wheel chocks, a route, such as the route 815, which may avoid the first asset 808 and the second asset 810 by a minimum of 10 meters (not to scale).

At step 914, the system may provide an ETA and/or a path to the asset based on a location of the smart chock and an estimated speed of the user 802 along the route 815 to the smart chock. The ETA may be sent, for example, to the device of the user 802 so that the user knows when he or she will arrive at the asset.

At step 916, the system may cause an indication to activate on the smart wheel chock. For example, the system may cause a light on the smart wheel chock to activate (e.g., a multi-colored LED) to inform the user of the correct location of the asset to which the user intends to board. The user's location (i.e., with respect to the smart wheel chock) may be determinable based on a location of the user's device. The system may determine a location of the user's device and when the user is within a certain radius of the smart wheel chock may activate the indication. Thus, the user may approach the asset assigned with the smart wheel chock and the user may know that he or she is at the correct asset without having to review his or her device. Alternatively or in addition, the system may cause the smart chock to activate the indication within a certain time frame of the user's ETA (for example, if the user has an ETA of 10:15 AM, the smart chock may activate an indication at 10:10 AM).

The general discussion of this disclosure provides a brief, general description of a suitable computing environment in which the present disclosure may be implemented. In one embodiment, any of the disclosed systems, methods, and/or graphical user interfaces may be executed by or implemented by a computing system consistent with or similar to that depicted and/or explained in this disclosure. Although not required, aspects of the present disclosure are described in the context of computer-executable instructions, such as routines executed by a data processing device, e.g., a server computer, wireless device, and/or personal computer. Those skilled in the relevant art will appreciate that aspects of the present disclosure can be practiced with other communications, data processing, or computer system configurations, including: Internet appliances, hand-held devices (including personal digital assistants ("PDAs")), wearable computers, all manner of cellular or mobile phones (including Voice over IP ("VoIP") phones), dumb terminals, media players, gaming devices, virtual reality devices, multi-processor systems, microprocessor-based or programmable consumer electronics, set-top boxes, network PCs, mini-computers, mainframe computers, and the like. Indeed, the terms "computer," "server," and the like, are generally used interchangeably herein, and refer to any of the above devices and systems, as well as any data processor.

Aspects of the present disclosure may be embodied in a special purpose computer and/or data processor that is specifically programmed, configured, and/or constructed to perform one or more of the computer-executable instructions explained in detail herein. While aspects of the present disclosure, such as certain functions, are described as being performed exclusively on a single device, the present disclosure may also be practiced in distributed environments where functions or modules are shared among disparate processing devices, which are linked through a communications network, such as a Local Area Network ("LAN"), Wide Area Network ("WAN"), and/or the Internet. Similarly, techniques presented herein as involving multiple devices may be implemented in a single device. In a distributed computing environment, program modules may be located in both local and/or remote memory storage devices.

Aspects of the present disclosure may be stored and/or distributed on non-transitory computer-readable media, including magnetically or optically readable computer discs, hard-wired or preprogrammed chips (e.g., EEPROM semiconductor chips), nanotechnology memory, biological memory, or other data storage media. Alternatively, computer implemented instructions, data structures, screen displays, and other data under aspects of the present disclosure may be distributed over the Internet and/or over other networks (including wireless networks), on a propagated signal on a propagation medium (e.g., an electromagnetic wave(s), a sound wave, etc.) over a period of time, and/or they may be provided on any analog or digital network (packet switched, circuit switched, or other scheme).

Program aspects of the technology may be thought of as "products" or "articles of manufacture" typically in the form of executable code and/or associated data that is carried on or embodied in a type of machine-readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer of the mobile communication network into the computer platform of a server and/or from a server to the mobile device. Thus, another type of media that may bear the software elements includes optical, electrical and electromagnetic waves, such as used across physical interfaces between local devices, through wired and optical landline networks and over various airlinks. The physical elements that carry such waves, such as wired or wireless links, optical links, or the like, also may be considered as media bearing the software. As used herein, unless restricted to non-transitory, tangible "storage" media, terms such as computer or machine "readable medium" refer to any medium that participates in providing instructions to a processor for execution.

The terminology used above may be interpreted in its broadest reasonable manner, even though it is being used in conjunction with a detailed description of certain specific examples of the present disclosure. Indeed, certain terms may even be emphasized above; however, any terminology intended to be interpreted in any restricted manner will be overtly and specifically defined as such in this Detailed Description section. Both the foregoing general description and the detailed description are exemplary and explanatory only and are not restrictive of the features, as claimed.

As used herein, the terms "comprises," "comprising," "having," including," or other variations thereof, are intended to cover a non-exclusive inclusion such that a process, method, article, or apparatus that comprises a list of elements does not include only those elements, but may include other elements not expressly listed or inherent to such a process, method, article, or apparatus.

In this disclosure, relative terms, such as, for example, "about," "substantially," "generally," and "approximately" are used to indicate a possible variation of ±10% in a stated value.

The term "exemplary" is used in the sense of "example" rather than "ideal." As used herein, the singular forms "a," "an," and "the" include plural reference unless the context dictates otherwise.

Other embodiments of the disclosure will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method comprising:
   receiving data associated with a unique identity of a vehicle asset to identify the vehicle asset;
   receiving data associated with a unique identity of a smart wheel chock to identify the smart wheel chock;
   associating the identified vehicle asset with the identified smart wheel chock, such that a location of the smart wheel chock can represent a location of the vehicle asset;
   receiving location data associated with the location of the smart wheel chock, wherein the received location data is based, at least in part, on location data generated by one or more systems on the smart wheel chock;
   identifying the vehicle asset location based on the received smart wheel chock location data such that the vehicle asset can be determined and relayed to a user device to locate the vehicle asset; and
   energizing data capture systems on the smart wheel chock to capture data associated with the identity of the vehicle asset based on the vehicle asset location data.

2. The method of claim 1, wherein at least a portion of the data associated with the unique identity of the vehicle asset is captured by a camera on the smart wheel chock.

3. The method of claim 2, wherein the camera captures image data of the vehicle asset when the vehicle asset is within a capture range of the camera.

4. The method of claim 2, further comprising:
   receiving location data associated with the location of the vehicle asset.

5. The method of claim 1, wherein the smart wheel chock is placed on one side of a wheel of the vehicle asset to arrest motion of the vehicle asset.

6. The method of claim 5, wherein: the smart wheel chock is a first smart wheel chock and a second smart wheel chock is communicatively coupled to the first smart wheel chock, the method further comprising:
   receiving data associated with a unique identity of the second smart wheel chock to identify the second smart wheel chock;
   associating the identified vehicle asset with the identified second smart wheel chock, such that a location of the second smart wheel chock can represent a location of the vehicle asset;
   receiving location data associated with the location of the second smart wheel chock, wherein the received location data is based, at least in part, on location data generated by one or more systems on the second smart wheel chock; and
   identifying the vehicle asset location based on the received second smart wheel chock location data such that the vehicle asset can be determined and relayed to a user device to locate the vehicle asset.

7. The method of claim 6, wherein first smart wheel chock and the second smart wheel chock are placed on opposite sides of a wheel of the vehicle asset to arrest motion of the vehicle asset.

8. The method of claim 1, further comprising:
   providing a location of the smart wheel chock to one or more guidance systems aboard the vehicle asset; and
   guiding the vehicle asset to the smart wheel chock based on the provided location of the smart wheel chock.

9. The method of claim 8, further comprising:
   energizing the data capture systems on the smart wheel chock to capture data associated with the identity of the asset based on providing the location data associated with the location of the smart wheel chock to the asset.

10. The method of claim 8, wherein the data capture systems on the smart wheel chock are energized based on a GPS location of the vehicle asset.

11. A system comprising:
    a vehicle asset;

a smart wheel chock comprising at least one vehicle asset identification system; and a processor and a memory storing one or more processor-readable instructions that, when executed, cause the processor to:

receive data associated with a unique identity of a vehicle asset to identify the vehicle asset;

receive data associated with a unique identity of a smart wheel chock to identify the smart wheel chock;

associate the identified vehicle asset with the identified smart wheel chock, such that a location of the smart wheel chock can represent a location of the vehicle asset;

receive location data associated with the location of the smart wheel chock, wherein the received location data is based, at least in part, on location data generated by one or more systems on the smart wheel chock;

identify the vehicle asset location based on the received smart wheel chock location data such that the vehicle asset can be determined and relayed to a user device to locate the vehicle asset; and energize data capture systems on the smart wheel chock to capture data associated with the identity of the vehicle asset based on the vehicle asset location data.

12. The system of claim 11, wherein at least a portion of the data associated with the unique identity of the vehicle asset is captured by a camera on the smart wheel chock.

13. The system of claim 12, wherein the camera captures image data of the vehicle asset when the vehicle asset is within a capture range of the camera.

14. The system of claim 12, wherein the instructions further cause the processor to:

receive location data associated with the location of the vehicle asset.

15. The system of claim 11, wherein the processor-readable instructions further cause the processor to:

provide a location of the smart wheel chock to one or more guidance systems aboard the vehicle asset; and guide the vehicle asset to the smart wheel chock based on the provided location of the smart wheel chock.

16. The system of claim 15, wherein the processor-readable instructions further cause the processor to:

energizing the data capture systems on the smart wheel chock to capture data associated with the identity of the asset based on providing the location data associated with the location of the smart wheel chock to the vehicle asset.

17. The system of claim 15, wherein the data capture systems on the smart wheel chock are energized based on a GPS location of the vehicle asset.

* * * * *